Jan. 31, 1928.
G. B. CHADWICK
1,657,914
BUSHING
Filed Dec. 20, 1924
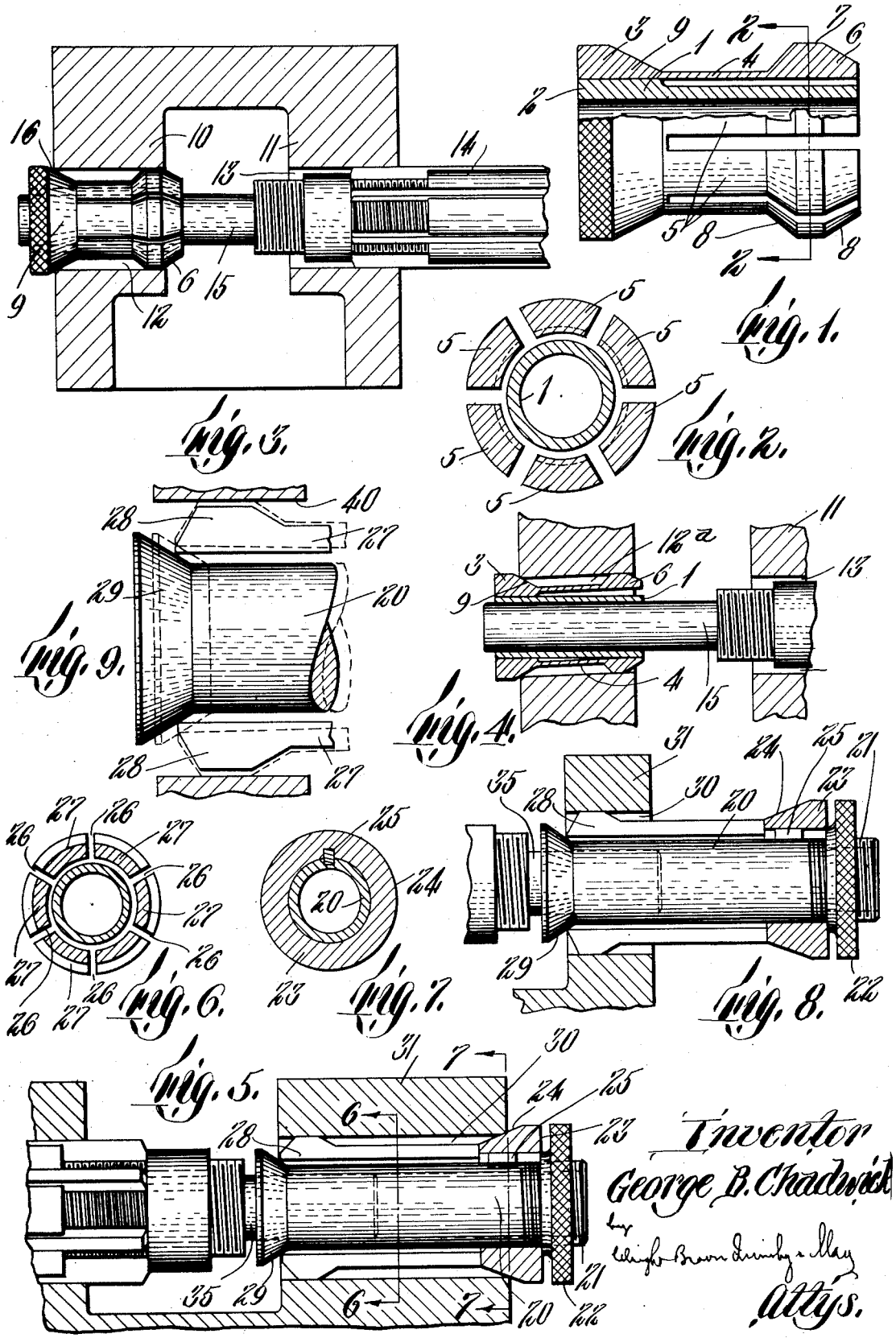

Patented Jan. 31, 1928.

1,657,914

UNITED STATES PATENT OFFICE.

GEORGE B. CHADWICK, OF PORTSMOUTH, NEW HAMPSHIRE.

BUSHING.

Application filed December 20, 1924. Serial No. 757,192.

This invention relates to bushings such as are particularly intended to serve as centering guides for tools such as reamers, counterbores, and the like, by which they may be supported at a distance from their cutting portions.

The bushing of the present invention may be centered at one lengthwise portion of a hole, the remainder of the bushing being allowed to float so that the tool guiding shank may be freely guided and centered therein even though a portion of the hole in which the bushing is placed may be out of alinement with the tool.

The bushing is also of the expanding type, but contrary to the usual practice it is made to its maximum normal diameter and is sprung to smaller diameter when used in holes of smaller than normal maximum size for which the bushing is designed. Beside the expanding work-engaging portion or shell the bushing has a central guide sleeve carrying the expansible portion at one end and serving as the tool guide. This sleeve may, if desired, be provided with means for adjustably limiting the amount to which the shell may be contracted, and such means may also be caused to effect an expansion of the work-engaging portion to a diameter greater than normal, if desired.

For a more complete understanding of this invention, reference may be had to the accompanying drawings in which Figure 1 is an elevation partly broken away illustrating one form of my invention.

Figure 2 is a section on line 2—2 of Figure 1.

Figure 3 is a cross section through work showing in elevation the form of bushing illustrated in Figures 1 and 2 when in use.

Figure 4 is a similar but fragmentary view showing the bushing in section.

Figure 5 represents a cross section through work showing another form of bushing in use.

Figures 6 and 7 are detail sections on lines 6—6 and 7—7 of Figure 5.

Figures 8 and 9 illustrate other ways of using the form of bushing shown in Figures 5, 6 and 7.

Referring first to the form shown in Figures 1 to 4, it will be seen that the bushing comprises a sleeve 1 carrying at one end 2 thereof a shell 3. The shell in this form of the bushing is in tight engagement with the end portion 2 of the sleeve, but beyond the portion 2 it is normally spaced therefrom as at 4. The free end of the shell is slotted inwardly substantially to the end of the portion 2 of the sleeve to form a series of segmental fingers 5 sufficiently resilient to be sprung inwardly until contact is made with the sleeve 1. Adjacent to the free ends of the fingers 5 they are thickened to produce an enlarged bead 6 extending circumferentially of the bushing, this bead being either rounded or formed frusto conical on opposite faces in order to produce a central enlarged portion 7 and walls 8 sloping outwardly therefrom. Similarly the opposite end of the shell is formed with a frusto conical enlargement or head 9 having a beveled inner part and which is of larger diameter than the normal diameter of the portion 7 of the bead.

As shown in Figure 1 the spacing between the fingers 5 and the sleeve is produced by reducing the external diameter of the sleeve back from the portion 2 thereof, though it is evident that it might be formed in other ways, as, for example, by reducing the internal diameter of the shell, or by placing a separate collar between the parts. The outside diameter 7 of the bead is that of the largest hole for which the bushing is designed to fit and when the bushing is placed in a hole smaller than this diameter the fingers are sprung together toward the sleeve 1.

One manner of using this bushing is shown in Figure 3. Referring to this figure, it will be seen that the work has a pair of spaced wall portions 10 and 11 having holes 12 and 13 therein which it is desired to ream in alinement with each other. A reamer is shown at 14 operating in the hole 13, this reamer having a guiding shank portion 15. The bushing is placed over the shank portion 15 which enters the sleeve 1 with a sliding fit and is pressed into the hole 12 externally of the work until the outer margin 16 of the hole abuts against the portion 9 of the bushing which causes the outer end of the bushing to be correctly centered with relation to this margin. The bead 6 extending within the hole 12 bears against the inner walls thereof and is somewhat compressed if this hole is of a size smaller than the normal external diameter of the bead. The sleeve 1, however, is free to float within the fingers 5 to conform to the angular position of the guide shank 15 so that if the holes in the work are not in axial alinement as originally made the reamer will be guided therethrough gaged by the outer edges of the holes 12 and 13 the reamed holes then being in alignment. For example, this is shown in Figure 4 in which it will be noted that the inner end of the sleeve 1 is eccentric to the hole 12$^a$, the fingers 5 on one side thereof being substantially in contact with this end of the sleeve while the fingers on the other side are sprung therefrom. The reamer may then be passed through the hole 13 and pushed through to the hole 12, moving the bushing ahead of it out of the hole 13, the reamer then being guided by the hole already reamed in the wall portion 11 during the reaming of which it was guided by the bushing.

It will be noted that in this use of the bushing the reamer is guided by the outer margins of the two holes. This is often a very desirable condition, as for example, in reaming out wrist pin holes in worn pistons. These wrist pins do not project entirely through the piston in order that they may not score the cylinders, and consequently the outer ends of the pin holes receive no wear in service so that they remain in their original condition even after the portions of the holes in which the pins ride have been considerably worn. When the piston in this condition is re-reamed the reamer is guided by those outer portions of the hole which are still true instead of by those portions which have been worn in service.

In Figures 5 to 9 another form of bushing has been shown in which instead of fixing the shell on to the sleeve, it is slidable axially thereof. As best shown in Figures 5 and 8, the rear end of the sleeve 20 is threaded as at 21 for engagement therewith of an adjusting nut 22 whose inner end bears against the unslotted end 23 of the shell 24. If desired, means may be provided for preventing relative rotation between the shell and the sleeve, such means as shown comprising a key 25. The opposite end of the shell 24 is slotted as at 26 to form resilient fingers 27 similar to the fingers 5 and having at their outer ends thickened portions 28 forming together an outwardly projecting rib or bead adjacent to the free ends of the fingers. The sleeve adjacent to the free ends of these fingers is provided with a frusto conical portion 29 and by manipulation of the nut 22 this frusto conical portion may be brought more or less within the shell 24 so as to limit the amount to which the fingers 27 may be sprung inwardly.

It sometimes happens that the hole to be reamed or counterbored is untrue at its outer margin, in which case it will be desirable to gage the guiding action from the walls of the hole at some point removed from this edge. With this form of the bushing this may be readily accomplished as shown in Figure 5. The bushing is inserted in the hole 30 in the work 31 so that the fingers 27 are compressed sufficiently to press firmly on the inner wall thereof at the desired axial position in the hole. The nut 22 is then manipulated to bring the frusto conical portion 29 into engagement with the fingers to hold them in this position. The outer end of the bushing is then free to conform to the angular position of the guide stem 35 of the reamer or other tool, the bushing then being centered at an intermediate portion of the length of the hole 30 rather than at its outer end. This action of the bushing may also be employed where the hole is through a comparatively thin wall as shown in Figure 8 where both the frusto conical portion 24 and the bead 28 cannot engage within the hole at the same time. It is also evident that where the frusto conical portion 29 is adjusted for one hole it forms means limiting the extent of inward springing of the fingers 27 so that the bushing will compress to the same size at each insertion. This conical portion may also be used when it is desired to lock the bushing firmly in the hole. It may also be used to expand the fingers 27 beyond their normal position so that the bushing may be used for holes somewhat larger than those for which it was designed, this being illustrated in Figure 9 in which the normal position of the finger ends is shown by full lines and the expanded position in dotted lines with these fingers engaging the inner wall of the hole 40.

Having thus described certain embodiments of this invention it should be evident to those skilled in the art that various changes and modifications might be made therein without departing from its spirit or scope as defined by the appended claims.

I claim:

1. A device comprising a sleeve, a work engaging shell carried by said sleeve and adjustable axially relative thereto, said shell being slotted inwardly from one end to form a plurality of resilient fingers normally spaced from the outer face of said sleeve, the unslotted end of said shell closely embracing said sleeve and of gradually increasing outside diameter away from said fingers, said fingers being formed to present an annular rib of enlarged diameter adjacent to their free ends, and said sleeve having a frusto conical end portion to adjustably fix the minimum diameter to which said fingers may be sprung inwardly.

2. A device comprising a sleeve externally threaded at one end, a work engaging shell carried by said sleeve, an adjusting nut engaging said threaded end and by the turning of which said shell may be adjusted axially of said sleeve, the opposite end of said sleeve being formed externally frusto conical, said shell being slotted inwardly from its end adjacent to said frusto conical sleeve portion to form work-engaging fingers normally out of contact with said sleeve but capable of being sprung inwardly thereto and to be sprung outwardly by sufficient movement of said frusto conical sleeve portion therebetween, said fingers presenting an enlarged work engaging bead adjacent to their free ends, and the unslotted end of said shell being of increasing external diameter away from said fingers.

3. A device comprising a sleeve externally threaded at one end, a work engaging shell carried by said sleeve, an adjusting nut engaging said threaded end and by the turning of which said shell may be adjusted axially of said sleeve, the opposite end of said sleeve being formed externally frusto conical, said shell being slotted inwardly from its end adjacent to said frusto conical sleeve portion to form work-engaging fingers normally out of contact with said sleeve but capable of being sprung inwardly thereto and to be sprung outwardly by sufficient movement of said frusto conical sleeve portion therebetween, said fingers presenting an enlarged work-engaging bead adjacent to their free ends, the unslotted end of said shell being of increasing external diameter away from said fingers, and means for preventing relative rotation between said sleeve and shell.

4. A device comprising a sleeve, a work engaging shell carried by said sleeve, said shell having a portion of increasing diameter engageable with the margin of a hole at one face of the work, and a plurality of resilient fingers attached to said shell, said fingers having portions of enlarged diameter to engage the inner wall of the hole at a location spaced inwardly from said face.

5. A device comprising a sleeve, a work engaging shell carried by said sleeve, said shell having a portion of increasing diameter engageable with the margin of a hole at one face of the work, and a plurality of resilient fingers attached to said shell and having portions of enlarged diameter to engage the inner wall of the hole at a location spaced inwardly from said face, said fingers being normally spaced from said sleeve but capable of being sprung inwardly thereto.

6. A device for centering a tool in an opening, comprising a sleeve-like body having an enlarged head which is provided with a beveled inner part, spring fingers attached to the beveled portion and surrounding and spaced from the body with enlarged portions at the ends of the fingers for cooperating with the beveled portion of the head to center the device in an opening.

7. A device for centering a tool in an opening, comprising a sleeve-like body having an enlarged head which is provided with a beveled inner part, spring fingers connected with the beveled portion and surrounding and spaced from the body with enlarged portions at the ends of the fingers for cooperating with the beveled portion of the head to center the device in an opening, the enlarged portions of the fingers being beveled to facilitate the device entering the opening.

In testimony whereof I have affixed my signature.

GEORGE B. CHADWICK.